(12) United States Patent
Hetzler et al.

(10) Patent No.: US 11,199,396 B2
(45) Date of Patent: Dec. 14, 2021

(54) COMPENSATION OPTICAL SYSTEM FOR AN INTERFEROMETRIC MEASURING SYSTEM

(71) Applicant: Carl Zeiss SMT GmbH, Oberkochen (DE)

(72) Inventors: Jochen Hetzler, Aalen (DE); Stefan Schulte, Lauchheim (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 0 days.

(21) Appl. No.: 16/833,571

(22) Filed: Mar. 28, 2020

(65) Prior Publication Data

US 2020/0225028 A1 Jul. 16, 2020

Related U.S. Application Data

(63) Continuation of application No. PCT/EP2018/075650, filed on Sep. 21, 2018.

(30) Foreign Application Priority Data

Sep. 29, 2017 (DE) ...................... 10 2017 217 369.6

(51) Int. Cl.
*G01B 11/02* (2006.01)
*G01B 11/24* (2006.01)
(Continued)

(52) U.S. Cl.
CPC ...... *G01B 11/2441* (2013.01); *G01B 9/02039* (2013.01); *G01B 9/02057* (2013.01);
(Continued)

(58) Field of Classification Search
CPC ............ G01B 11/2441; G01B 9/02039; G01B 9/02057; G01B 9/02072; G01B 2290/30;
(Continued)

(56) References Cited

U.S. PATENT DOCUMENTS

| 5,737,079 A | 4/1998 | Burge et al. |
| 7,061,626 B1 | 6/2006 | Schillke et al. |

(Continued)

FOREIGN PATENT DOCUMENTS

| DE | 102012217800 A1 | 4/2014 |
| DE | 102015209490 A1 | 11/2016 |

(Continued)

OTHER PUBLICATIONS

International Search Report, PCT/EP2018/075650, dated Nov. 20, 2018, 6 pages.

(Continued)

*Primary Examiner* — Tarifur R Chowdhury
*Assistant Examiner* — Jonathon Cook
(74) *Attorney, Agent, or Firm* — Edell, Shapiro & Finnan LLC (57) ABSTRACT

A compensation optical unit (30) for a measurement system (10) for determining a shape of an optical surface (12) of a test object (14) by interferometry generates a measuring wave (44), directed at the test object, with a wavefront that is at least partly adapted to a target shape of the optical surface from an input wave (18). The unit includes first (32) and second (34) optical elements disposed in a beam path of the input wave. The second optical element is a diffractive optical element configured to split the input wave into the measuring wave and a reference wave (42) following an interaction with the first optical element. At least 20% of a refractive power of the entire compensation optical unit is allotted to the first optical element, and this allotted refractive power has the same sign as the refractive power of the entire compensation optical unit.

20 Claims, 5 Drawing Sheets

(51) Int. Cl.
  *G01B 9/02* (2006.01)
  *G01M 11/00* (2006.01)
  *G01N 21/17* (2006.01)
  *G02B 27/00* (2006.01)
  *G02B 27/42* (2006.01)

(52) U.S. Cl.
  CPC ....... *G01B 9/02072* (2013.04); *G01M 11/005* (2013.01); *G01N 21/17* (2013.01); *G02B 27/0037* (2013.01); *G02B 27/4233* (2013.01); *G01B 2290/30* (2013.01)

(58) Field of Classification Search
  CPC ............ G01M 11/005; G01M 11/0271; G02B 27/0037; G02B 27/4233
  See application file for complete search history.

(56) References Cited

U.S. PATENT DOCUMENTS

| | | | |
|---|---|---|---|
| 8,345,262 B2 | 1/2013 | Schillke et al. | |
| 2006/0274325 A1 | 12/2006 | Hetzler et al. | |
| 2008/0043247 A1* | 2/2008 | Arnold | G01B 11/2441 356/512 |
| 2008/0137090 A1* | 6/2008 | Hetzler | G01B 9/02039 356/458 |
| 2008/0316500 A1* | 12/2008 | Schulte | G01B 9/02057 356/521 |
| 2009/0128829 A1 | 5/2009 | Schillike et al. | |
| 2010/0177321 A1* | 7/2010 | Hetzler | G01B 11/2441 356/512 |
| 2015/0198438 A1 | 7/2015 | Hetzler | |
| 2018/0106591 A1 | 4/2018 | Hetzler et al. | |

FOREIGN PATENT DOCUMENTS

| | | |
|---|---|---|
| EP | 1316789 A1 | 6/2003 |
| WO | 2005114101 A1 | 12/2005 |
| WO | 2008012091 A2 | 1/2008 |
| WO | 2008110239 A1 | 9/2008 |

OTHER PUBLICATIONS

German Office Action, 10 2017 217 369.6, dated May 23, 2018, 12 pages.

International Preliminary Reporton Patentability, PCT/EP2018/075650, dated Mar. 31, 2020, 16 pages.

Kleemann et al., "Combination of blazed and laterally blazed structures", Diffractive Optics and Micro-Optics, OSA Technical Digest (Optical Society of America), paper DTuC7, 2004, pp. 1-3.

Asfour et al., "Asphere testing with a Fizeau interferometer based on a combined computer-generated hologram", J. Opt. Soc. Am. A. vol. 23, No. 1/ Jan. 2006, 7 pages.

O'Shea, "Diffractive Optics, Design, Fabrication, and Test", The Society of Photo-Optical Instrumentation Engineers, 2004, 9 pages.

Poleshchuk et al., "Combined computer-generated hologram for testing steep aspheric surfaces", Opt. Express, vol. 17, NR. 7, 2009, pp. 5420-5425.

* cited by examiner

COMPENSATION OPTICAL SYSTEM FOR AN INTERFEROMETRIC MEASURING SYSTEM

CROSS REFERENCE TO RELATED APPLICATIONS

This is a Continuation of International Application PCT/EP2018/075650, which has an international filing date of Sep. 21, 2018, and the disclosure of which is incorporated in its entirety into the present Continuation by reference. In addition, the present Continuation claims the benefit of and priority to German patent application 10 2017 217 369.6, filed Sep. 29, 2017. The entire content and disclosure of this German patent application is also incorporated by reference into the present Continuation.

FIELD OF THE INVENTION

The invention relates to an optical compensation unit for a measurement system used for determining a shape of an optical surface of a test object by interferometry, a measurement system having such a compensation optical unit and a method for determining a shape of an optical surface of a test object by interferometry.

BACKGROUND

For the highly accurate interferometric measurement of a surface shape of a test object, for instance an optical element for a projection lens of a microlithographic exposure apparatus, diffractive optical arrangements are often used as so-called zero optics or compensation optical units. In this case, the wavefront of a measuring wave is adapted to a target shape of the surface by way of a diffractive element in such a way that it would be incident on the target shape in perpendicular fashion at every location and be reflected back on itself thereby. Deviations from the target shape can be determined by superimposing a reference wave on the reflected test wave. The diffractive element used can be a computer-generated hologram (CGH), for example.

DE 10 2012 217 800 A1 describes such a measurement system having a complex coded CGH. A light wave is initially split into a reference wave and a test wave using a Fizeau element. The test wave is then converted by the complex coded CGH into a test wave having a wavefront that is adapted to the target shape of the surface and calibration waves having a spherical or plane wavefront. To this end, the CGH has suitably embodied diffractive structures. The calibration waves are used to calibrate the CGH. A test object is subsequently arranged in the test position, and a measurement using the test wave is carried out. The test wave is reflected by the surface of the test Object, transformed back by the CGH, and, following the passage through the Fizeau element, it is superimposed by the reference wave. It is possible to determine the shape of the surface from the interferogram captured in a plane. Here, a very high degree of accuracy is attained due to the calibration of the CGH.

However, one problem in measuring highly accurate surfaces using the known interferometric measurement systems is that a change in the optical properties of the CGH or other optical elements of the interferometer may occur between the calibration and the subsequent measurement of the test object. Such changes are caused by temperature changes, in particular. In the case of a CGH with a quartz substrate, even inhomogeneous temperature changes in the mK range can cause a reduction in the measurement accuracy after a calibration, in particular on account of the temperature dependence of the refractive index of quartz.

A further problem lies in the constantly increasing demands on the absolute accuracy of the diffractive structures of the CGH. The corresponding stripe patterns can only be manufactured with limited accuracy. In the case of high CGH stripe densities, which are required for measuring high numerical aperture test surfaces, electromagnetic effects continue to occur even in the case of, for example, an almost perfect binary step profile, and limit the accuracy of the diffractive fringe patterns. In this context, high numerical aperture test surfaces are understood to mean surfaces with an aperture angle $\alpha$ of at least 40°, in particular of at least 70°. High numerical aperture (NA) extreme ultraviolet (EUV) lithography apparatuses comprise mirrors with such high numerical aperture surfaces.

SUMMARY

It is an object of the invention to provide a compensation optical unit for an interferometric measurement system and a method of the type set forth at the outset, with which the aforementioned problems are addressed or resolved. It is also an object, in particular, to provide such a unit and method with which the surface shape of a high numerical aperture test surface can be determined with high precision.

The above-described object can be achieved, according to one formulation of the invention, with a compensation optical unit for a measurement system used for determining a shape of an optical surface of a test object by interferometry. The aforementioned compensation optical unit is configured to generate a measuring wave, directed at the test object, with a wavefront that is at least partly adapted to a target shape of the optical surface from an input wave. The compensation optical unit comprises: a first optical element and a second optical element, disposed downstream of the former, in a beam path of the input wave. The second optical element is a diffractive optical element, which is configured to split the input wave into the measuring wave and a reference wave following an interaction with the first optical element. At least 20%, in particular at least 50% or at least 90%, of a refractive power of the entire compensation optical unit, which is provided for generating the at least partly adapted wavefront of the measuring wave from a wavefront of the input wave, is allotted to the first optical element and the refractive power allotted to the first optical element has the same sign as the refractive power of the entire compensation optical unit.

The rest of the refractive power is allotted to remaining optical elements in the compensation optical unit, in particular to the second optical element only if no optical element in addition to the first and the second optical element is provided in the compensation optical unit. The refractive power allotted to the first optical element has the same sign as the refractive power of the entire compensation optical unit; i.e., depending on whether the entire compensation optical unit has a diverging function (negative refractive power) or a converging function (positive refractive power) on the input wave when generating the measuring wave, the first optical element also has a diverging function (diverging lens element) or a converging function (converging lens element).

As is known, the refractive power D of an optical unit is defined by the reciprocal of the focal length f of the optical element $(D=1/f)$. The definition of the focal length f of an optical element relates to the distance of the focal point, as measured from the optical unit, of a spherical wave generated by the optical unit when a plane wave is radiated thereon. In the case of an optical unit that generates a wave with both spherical and aspherical components, the refractive power of the optical unit is only calculated from the spherical component. Consequently, a purely aspherical optical unit, i.e., an optical unit that generates an aspherical wave without spherical components when a plane wave is radiated thereon, has a refractive power of zero.

The statement that the second optical element is disposed downstream of the first optical element in a beam path of the input wave should be understood to mean that the two optical elements are disposed in such a way that at least individual rays of the input wave interact with both optical elements.

The successive arrangement of two optical elements in the beam path of the input wave and the provision of at least 20% of the refractive power of the entire compensation optical unit for the first optical element reduces the refractive power allotted to the diffractive optical element referred to as second optical element. Hence, the stripe density of the diffractive structures of the diffractive optical element can be reduced. Manufacturing inaccuracies are less important in the case of diffractive structures with such a reduced stripe density. In particular, there are fewer electromagnetic effects that limit the accuracy of the diffractive structures. Hence, high numerical aperture test surfaces can be determined with improved accuracy with the compensation optical unit according to the invention.

By configuring the second optical element to split the input wave into the measuring wave and the reference wave following an interaction with the first optical element, a separate beam splitter, such as a Fizeau element, for dividing the input wave into the measuring wave and reference wave can be dispensed with. Following an interaction with the optical surface to be tested, the same diffractive optical element is used to superimpose the reference wave on the measuring wave. Consequently, deviations of the diffractive optical element, such as, for instance, temperature-induced deviations in the refractive index of a quartz substrate, act on both the measuring wave and the reference wave. When the reference wave is superimposed on the measuring wave, these errors are largely compensated, leading to further improvement in the measurement accuracy of the interferometric measurement system.

According to one embodiment, the second optical element comprises a substrate and diffractive structures, which are configured both for splitting the input wave into the measuring wave and the reference wave and for an improved adaptation of the wavefront of the input wave, which is approximately adapted to the target shape of the optical surface by an interaction with the first optical element, to the target shape. The improved adaptation is, in particular, a fine adaptation; aspherical or spherical wavefront changes can be made in the process. In this context, the improved adaptation or the fine adaptation should be understood to be an adaptation that is considerably more precise than the approximate adaptation, in particular an adaptation which is more precise by at least one order of magnitude. Thus, in particular, the approximate adaptation can only affect spherical components, while the improved adaptation relates to aspherical components, which can have rotationally symmetric and/or non-rotationally symmetric portions.

According to an embodiment variant, the substrate of the second optical element comprises two opposing surfaces and the diffractive structures are further configured to split the input wave into the measuring wave and the reference wave, wherein the diffractive structures are only disposed on one of the two surfaces of the substrate. Expressed differently, the two functions of the second optical element are provided by diffractive structures disposed on a single surface of the substrate.

According to a further embodiment, the second optical element is configured to generate the reference wave in reflection from the input wave following the interaction of the latter with the first optical element. In particular, the reference wave is generated in such a way that it runs back in the beam path of the input wave incident on the first optical element, i.e., the reference wave is generated in Littrow reflection. By contrast, the measuring wave passes through the second optical element.

According to a further embodiment, the second optical element comprises a complex coded phase grating with at least two different phase functions. Expressed differently, the second optical element is a multiply coded diffractive optical element or a multiply coded CGH. Hence, the second optical element has two diffractive structure patterns disposed in superimposed fashion in one plane. In particular, the first phase function is configured to split the input wave into the measuring wave and the reference wave following an interaction with the first optical element and the second phase function is configured to provide the refractive power allotted to the second optical element for generating the at least partially adapted wavefront of the measuring wave.

According to an alternative embodiment, the second optical element is embodied to generate the measuring wave in a first order of diffraction and generate the reference wave in a further order of diffraction.

According to a further embodiment, the second optical element is configured to generate the reference wave in transmission from the input wave following the interaction with the first optical element.

According to a further embodiment, the second optical element is configured to generate at least one further wave in the form of a calibration wave in addition to the measuring wave and the reference wave from the input wave following the interaction of the latter with the first optical element. The at least one further calibration wave is used to calibrate errors in the diffractive structure of the second optical element and, according to one embodiment variant, can have a spherical wavefront. According to an embodiment variant, the second optical element is configured to generate at least three further waves, each in the form of a calibration wave. According to an embodiment variant, the three calibration waves are each spherical waves with different directions of propagation.

In order to generate the at least one calibration wave, the second optical element can be a complex coded phase grating with at least three different phase functions; if three calibration waves are generated, said second optical element can be a complex coded phase grating with five different phase functions, i.e., a five-times coded diffractive optical element.

In the embodiment variant with three spherical calibration waves, use can be made of the procedure, described below, for calibrating the second optical element. In this case, calibration spheres appropriately adapted to the spherical calibration waves are disposed in succession in the respective beam path of the calibration waves and each measured by interferometry. The interferometric measurement results are then stored in an evaluation device as calibration measurement data for each of the spherical calibration waves. During a subsequent measurement of the optical surface of the test object with the measuring wave, the measurement data obtained in the process are evaluated by the evaluation device, with the stored calibration measurement data being taken into account. Since the calibration measurement data obtained during the measurement of the spherical calibration waves is taken into account, manufacturing errors of the second optical element can be corrected in the measurement result of the test surface, as result of which the shape of the test surface can be determined with great accuracy.

Consequently, it is possible to dispense with explicit measurement of distortion errors of the diffractive structure pattern of the second optical element. The option of calibrating the shape measurement of the test surface with three spherical waves renders it possible to achieve greater accuracy. In particular, this is due to the fact that shape or profile deviations of the diffractive structure pattern generate very similar deviations in the spherical calibration waves and the measuring wave. Hence, these shape or profile deviations are able to be calibrated for the most part.

According to a further embodiment, the first optical element is an optical element that can be described by geometrical optics. In particular, the first optical element is embodied as a lens element or as a mirror. Here, an optical element that can be described by geometrical optics should be understood to mean an optical element whose effect on a light wave is describable by geometrical optics, as is the case, for instance, with a lens element or a mirror. Consequently, such an optical element that is describable by geometrical optics is not a diffractive optical element, the effect of which is describable using wavediv optics.

According to an embodiment variant, the first optical element comprises at least one aspherical optical surface. At least one of the lens element surfaces has an aspherical embodiment in the case where the first optical element is a lens element. The mirror surface has an aspherical embodiment in the case where the first optical element is a mirror. Here, an aspherical surface should be understood to mean, in particular, a surface that has a deviation from any ideal sphere of at least 10 µm, in particular of at least 20 µm. Expressed differently, the aspherical surface deviates in at least one point from every ideal sphere by at least 10 µm.

According to a further embodiment, the first optical element is a diffractive optical element. According to an embodiment variant, the first optical element is a multi-step CGH, i.e., a CGH with a multi-step phase grating, in particular a blazed grating. A so-called blazed grating is a multi-step phase grating with so many steps that its profile is represented by inclined surfaces.

According to a further embodiment variant, the first optical element is an exposure hologram, i.e., a diffractive optical element produced by holographic exposure.

According to a further embodiment, the refractive power of the first optical element and a refractive power of the second optical element have the same sign. Expressed differently, the corresponding refractive power of the two optical elements is positive in each case or negative in each case, i.e., both optical elements respectively have a converging or a diverging optical effect.

According to the invention, a measurement system for determining a shape of an optical surface of a test object by interferometry with a compensation optical unit as per one of the aforementioned embodiments or embodiment variants is furthermore provided. The measurement system comprises a light source for providing the input wave and a capturing device for capturing an interferogram, which is generated by superimposing the measuring wave following the interaction with the test object and the reference wave.

According to an embodiment, the second optical element is configured to generate the reference wave in transmission from the input wave following the interaction of the latter with the first optical element, said reference wave having a direction of propagation that deviates from a direction of propagation of the measuring wave, and the measurement system further comprises a reflective optical element, which is disposed in the beam path of the reference wave and embodied to reflect back the reference wave.

According to a further embodiment of the measurement system, the input wave deviates from a spherical wave by at most 10 µm, in particular by at most 5 µm, following an interaction with the first optical element.

By way of further formulation, the aforementioned problem can also be solved according to the invention with a method for determining a shape of an optical surface of a test object by interferometry. The method comprises providing an input wave and generating a reference wave and a measuring wave directed at the test object with a wavefront that is at least partly adapted to a target shape of the optical surface by radiating the input wave onto a compensation optical unit, which comprises a first optical element disposed in the beam path of the input wave and a second optical element, disposed downstream of the former in a beam path of the input wave in the form of a diffractive optical element such that, following an interaction with the first optical element, the input wave is split into the measuring wave and the reference wave by the diffractive optical element. At least 20% of a refractive power of the entire compensation optical unit applied in the generation of the measuring wave is allotted to the first optical element and the refractive power allotted to the first optical element has the same sign as the refractive power of the entire compensation optical unit. Furthermore, the method according to the invention comprises capturing an interferogram, which is generated by superimposing the measuring wave following the interaction with the test object and the reference wave.

The features specified in respect of the embodiments, exemplary embodiments and embodiment variants, etc., of the compensation optical unit according to the invention or the measurement system according to the invention, listed above, can be accordingly transferred to the measurement method according to the invention. These and other features of the embodiments according to the invention are explained in the description of the Figures and in the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention are illustrated in the following detailed description of exemplary embodiments according to the invention with reference to the accompanying schematic drawings. In the drawings.

DETAILED DESCRIPTION

In the exemplary embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
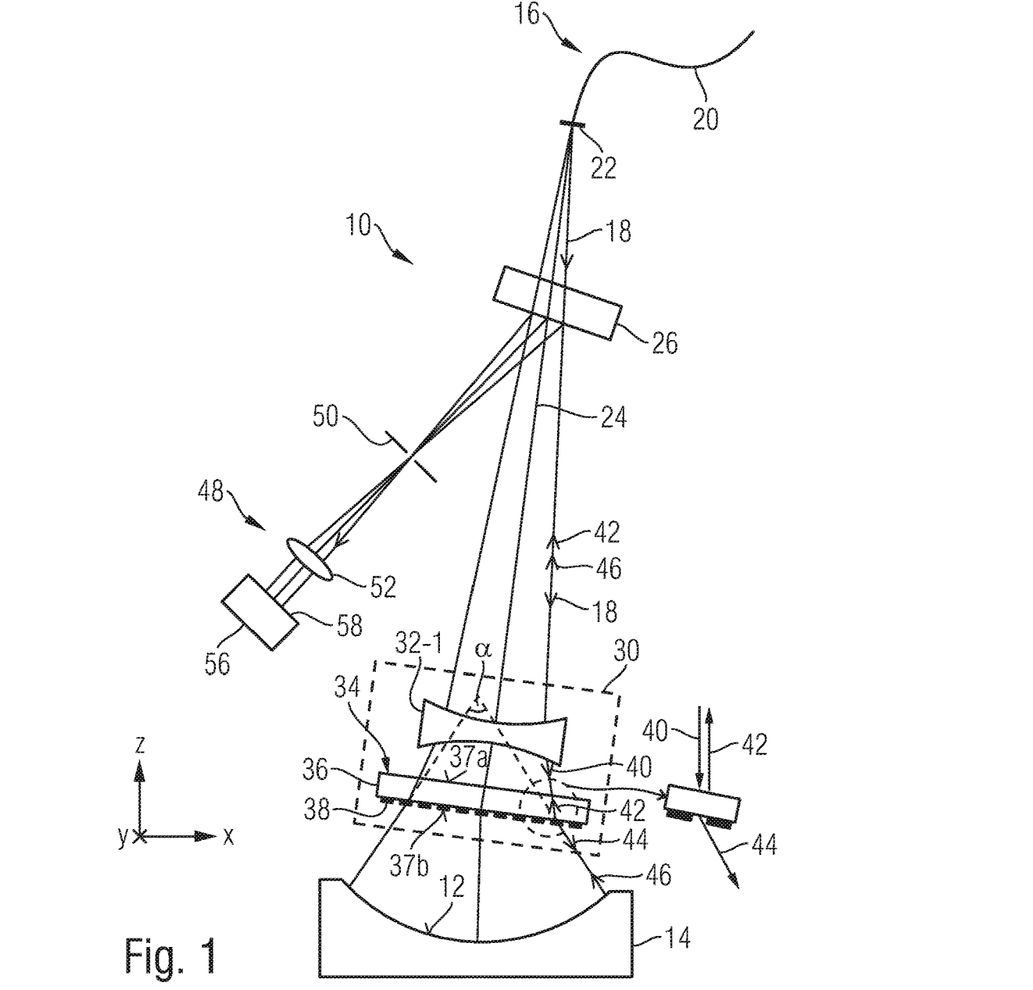
FIG. 1 shows a first embodiment according to the invention of a measurement system for determining the shape of an optical surface of a test object by interferometry, with a compensation optical unit which comprises two optical elements arranged in succession.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into said plane, the x-direction extends toward the right, and the z-direction extends upward.

FIG. 1 depicts an exemplary embodiment of a measurement system 10 for determining the shape of an optical surface 12 of a test object 14 by interferometry. The measurement arrangement 10 can be used, in particular, to determine a deviation of the actual shape of the surface 12 from a target shape. The measurement arrangement 10 is particularly suitable for measuring a high numerical aperture surface of a mirror of a microlithographic projection lens. In this context, a high numerical aperture surface is understood to mean a surface with an aperture angle $\alpha$ of at least 40°, in particular of at least 70°. In particular, a spherical or non-spherical surface for reflecting EUV radiation, i.e., radiation with a wavelength of less than 100 nm, in particular a wavelength of approximately 13.5 nm or approximately 6.8 nm, can be provided as the surface 12 to be measured. The non-spherical surface of the mirror can have a free-form surface with a deviation from each rotation-symmetric asphere of more than 5 μm and a deviation from each sphere of at least 1 mm.

The measurement system 10 comprises a light source 16 for providing a sufficiently coherent measurement radiation as an input wave 18. In this exemplary embodiment, the light source 16 comprises an optical waveguide 20 having an exit surface 22. The optical waveguide 22 is connected to a radiation source (not illustrated in FIG. 1), e.g. in the form of a laser. By way of example, an Nd:Yag laser with a wavelength of approximately 532 nm or a helium-neon laser with a wavelength of approximately 633 nm can be provided to this end. However, the illumination radiation may also have a different wavelength in the visible or non-visible wavelength range of electromagnetic radiation. The light source 16 with the optical waveguide 20 constitutes merely one example of a light source that may be used for the measurement arrangement. In alternative embodiments, rather than the optical waveguide 20, an optical arrangement with lens elements, mirror elements or the like can be provided for providing the input wave 18.

The measurement system 10 furthermore contains a compensation optical unit 30 for generating a measuring wave 44 and a reference wave 42 from the input wave 18. The measurement radiation provided by the light source 16 emerges from the exit face 22 of the optical waveguide 20 in the form of an input wave 18 having a spherical wavefront and propagates divergently along a propagation axis 24 that is directed at the diffractive optical element 24. In the process, the input wave 18 initially passes through the beam splitter 26 and then strikes the compensation optical unit 30. In alternative embodiments, a collimator for generating an input wave 18 having a plane wavefront can be provided between the beam splitter 26 and the compensation optical unit 30.

The compensation optical unit 30 comprises a first optical element 32 in the form of a diverging lens element 32-1 and a second optical element 34 in the form of a diffractive optical element. The second optical element 34 is disposed downstream of the first optical element 32 in the beam path of the input wave, which is denoted by reference sign 18 prior to the incidence on the first optical element and denoted by reference sign 40 following the passage through the first optical element 32.

The first optical element 32 is used to approximately adapt the wavefront of the input wave 18 to the target shape of the optical surface 12 to be measured and to consequently generate an approximated input wave 40. In the approximate adaptation, the input wave 18 is either partly or completely adapted to the spherical part of the target shape of the surface 12. In the case of a complete adaptation, the approximated input wave 40 only has non-spherical deviations from the target shape of the surface.

The second optical element 34 is embodied as a complex coded CGH and contains a plate-shaped substrate 36 and diffractive structures 38 disposed on one of the two surfaces 37a and 37b of the substrate 36, on the lower side 37b of the substrate 36 in this case, said diffractive structures forming two diffractive structure patterns disposed in superimposed fashion in a plane. These two diffractive structure patterns can be formed, for example, by superimposing a first structure pattern and a second structure pattern. Expressed differently, the second optical element 34 comprises a complex coded phase grating with at least two different phase functions.

A first of the two diffractive structure patterns or a first of the two phase functions is configured to generate the measuring wave 44 with a wavefront that is adapted at least in part to the shape of the optical surface 12. The measuring wave 44 is generated here by way of, in terms of absolute value, first-order or higher-order diffraction of the approximated input wave 40 at said diffractive structure pattern, such as for example first order of diffraction. The direction of propagation of the measuring wave 44 is tilted by at least 1° with respect to the propagation direction of the approximated input wave 40.

Figure 2:
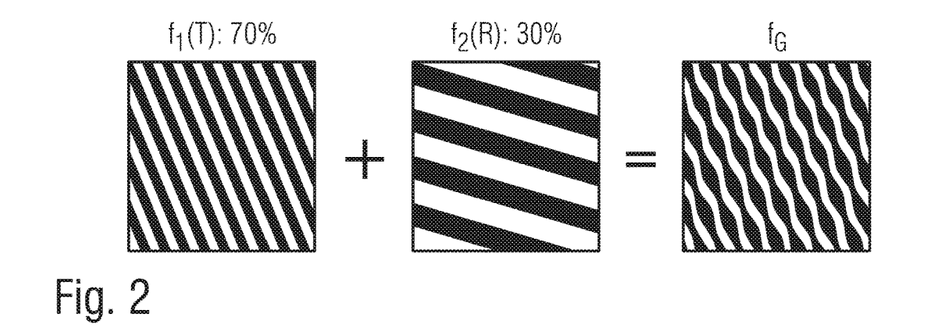
FIG. 2 shows a diffractive structure pattern of the second optical element, configured as a complex coded CGH, of the compensation optical unit according to FIG. 1.

FIG. 2 shows an exemplary embodiment of a complex coded phase grating, formed by the diffractive structures 38, with two different phase functions $f_1$ and $f_2$, the weighted superposition of which results in an overall phase function $f_G$. In the exemplary embodiment according to FIG. 2, $f_G$ is formed by weighting $f_1$ with 70% and $f_2$ with 30%. The representations of the individual phase functions $f_1$ and $f_2$ in FIG. 2 show contour lines of the respective function. These contour lines correspond to grating lines of the respective diffraction grating or structure pattern. The representation of $f_G$ shows a greatly magnified section of the pattern formed by the diffractive structures 38. The complex coded phase grating $f_G$ acts on the incoming approximated input wave 40 in such a way that each diffractive structure pattern defined by the phase functions $f_1$ and $f_2$ generates corresponding, mutually independent diffracted waves, specifically the measuring wave 44 via the phase function $f_1$ in transmission and the reference wave 42 via the phase function $f_2$ in Littrow reflection. The intensities of the measuring wave 44 and the reference wave 42 emerge from the weights of the associated phase functions. The illustration shows a weight of 70% for the measuring wave 44 and 30% for the reference wave 42.

As already mentioned above, the input wave 18 is partly or completely adapted to the spherical part of the target shape of the surface 12 by the first optical element 32. In the case where the first optical element 32 only carries out a partial adaptation to the spherical component, the adaptation performed by the second optical element 34 optionally comprises a further spherical wavefront change and a non-spherical wavefront change, for instance for carrying out an adaptation to a free-form shape of the target shape of the surface 12.

At least 20%, in particular at least 50% or at least 90%, of the refractive power of the entire compensation optical unit 30 is allotted to the first optical element 32. In other words, this first optical unit 32, is provided for generating the wavefront of the measuring wave 44 from the wavefront of the input wave 18, i.e., the cumulative refractive power. Specifically, the first optical element 32 is configured as a diverging lens element, and the first diffractive structure pattern of the second optical element 34 is defined by the phase function $f_1$. Here, the refractive power allotted to the first optical element 32 has the same sign as the refractive power of the entire compensation optical unit 30; i.e., depending on whether the entire compensation optical unit 30 has a diverging function (negative refractive power) or a converging function (positive refractive power) on the input wave 18 when generating the measuring wave 44, the first optical element 32 also has a diverging function (diverging lens element) or a converging function (converging lens element). In the embodiment illustrated in FIG. 1, the first optical element 32 and the second optical element 34 each have a diverging function and hence a negative refractive power.

As is known, the refractive power D of an optical unit is defined by the reciprocal of the focal length f of the optical element (D=1/f). The definition of the focal length f of an optical element relates to the distance from the optical unit of the focal point of a spherical wave generated by the optical unit when a plane wave is radiated thereon. In the case of an optical unit that generates a wave with both spherical and aspherical components, the refractive power of the optical unit is only calculated from the spherical component. Consequently, a purely aspherical optical unit, i.e., an optical unit that generates an aspherical wave without spherical components when a plane wave is radiated thereon, has a refractive power of zero. The specification above, according to which at least 20% of the refractive power of the entire compensation optical unit 30 is allotted to the first optical element 32, means that at least 20% of the adaptation of the wavefront of the input wave to the spherical portion of the target shape of the surface 12 performed by the entire compensation optical unit 30 is performed by the first optical element 32.

As already mentioned above, the second diffractive structure pattern or the second phase function $f_2$ of the second optical element 34 generates the reference wave 42 in Littrow reflection, i.e., the reference wave 42 runs back in the beam path of the approximated input wave 40 and has the wavefront of the approximated input wave 40. The reference wave 42 is generated by way of, in terms of absolute value, first-order or higher-order diffraction of the approximated input wave 40 at the second diffractive structure pattern, such as for example first order of diffraction.

The measuring wave 44 is reflected at the optical surface 12 of the test object 14 and runs back as a returning measuring wave 46 to the second optical element 34, from where it returns together with the reference wave 42 to the beam splitter 26 along the propagation axis 24, passing through the first optical element 32 in the process. The beam splitter 26 guides the combination of the returning measuring wave 24 and the reference wave 42 out of the beam path of the input wave 18. Further, the measurement system 10 contains a capturing device 48 with a stop 50, an eyepiece 52 and an interferometer camera 56 for capturing an interferogram generated by superimposing the reference wave 42 with the measuring wave 44 in a detection plane 58 of the interferometer camera 56.

An evaluation device (not illustrated in FIG. 1) of the measurement system 10 determines the actual shape of the optical surface 12 of the test object 14 from the one or more interferograms captured by the interferometer camera 56. To this end, the evaluation device has a suitable data processing unit and uses corresponding calculation methods known to a person skilled in the art. Alternatively or additionally, the measurement system can contain a data memory or an interface with a network to make possible a determination of the surface shape using the interferogram that is stored or transmitted via the network by way of an external evaluation unit. In the determination of the surface shape, the evaluation unit takes into account, in particular, a result of a calibration of the second optical element 34, which is configured as a diffractive optical element. An exemplary embodiment of such a calibration is described below with reference to FIG. 6.

Figure 3:
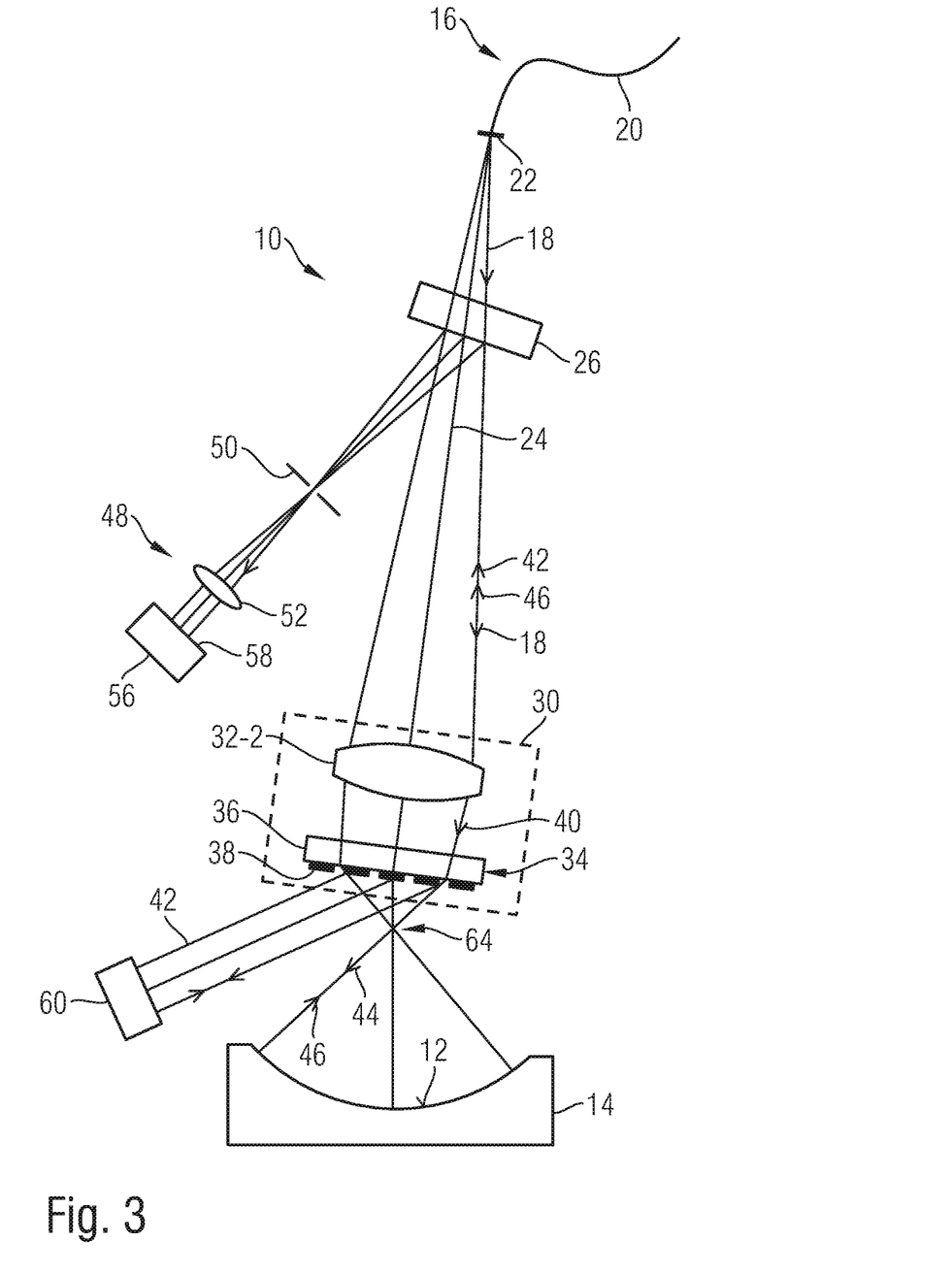
FIG. 3 shows a further embodiment according to the invention of a measurement system for determining the shape of an optical surface of a test object by interferometry.

FIG. 3 depicts a further exemplary embodiment of a measurement system 10 for determining the shape of an optical surface 12 of a test object 14 by interferometry. The measurement system 10 according to FIG. 3 differs from the measurement system according to FIG. 1 only in the structure of the compensation optical unit 30 and in that, furthermore, provision is made of a reflective optical element 60 disposed in the beam path of the reference wave 42.

The compensation optical unit 30 according to FIG. 3, like the compensation optical unit 30 according to FIG. 1, comprises a first optical element 32 and a second optical element 34 in the form of a diffractive optical element, but the first optical element 32 according to FIG. 3 is embodied as a converging lens element 32-2 for generating the approximated input wave 40 in the form of a convergent beam.

Furthermore, the second optical element 34 according to FIG. 3 is provided with a different functionality. Like in the embodiment according to FIG. 1, a first phase function of the second optical element 34 configured as a complex coded CGH is configured to generate the measuring wave 44 with a wavefront at least partly adapted to the shape of the optical surface 12. However, the measuring wave 44 differs in the embodiment according to FIG. 3 in that it is formed by a convergent beam, the convergence being magnified in comparison with the approximated input wave 40 in the embodiment variant shown.

Expressed differently, the first phase function of the second optical element 34 exerts a converging effect on the approximated input wave 40. Hence, both the first optical element 32-2 and the second optical element 34 have positive refractive power. After passing through a focal point 64, the measuring wave 44 becomes a divergent beam which has a sufficiently dimensioned wavefront surface at the location of the surface 12 to be measured. In accordance with the embodiment according to FIG. 1, at least 20%, in particular at least 50% or at least 90%, of the refractive power of the entire compensation optical unit 30, which is provided for generating the wavefront of the measuring wave 44 from the wavefront of the input wave 18, is allotted to the first optical element 32.

Like in the embodiment according to FIG. 1, a second phase function of the second optical element 34 according to FIG. 3 is configured to generate the reference wave 42, albeit not in reflection but in transmission. The direction of propagation of the reference wave 42 is tilted relative to the direction of propagation of the input wave 18, to be precise in such a way that there is a sufficiently large angle between the direction of propagation of the reference wave 42 and the direction of propagation of the measuring wave 44 for the trouble-free placement of the reflective optical element 60. The reflective optical element 60 is configured in the form of a plane mirror for back-reflection of the reference wave 42 with a plane wavefront. In another configuration, the reference wave 42 can have a spherical wavefront and the reflective optical element can be configured as a spherical mirror. The reference wave 42 runs back to the second optical element 34 and is coupled by the latter into the beam path of the approximated input wave 40 in such a way that it has the wavefront of the approximated input wave 40.

The returning reference wave 42, together with the likewise returning measuring wave 46 following its reflection at the surface 12, passes through the beam path of the measurement system 10, already explained with reference to FIG. 1, for generating an interferogram in the capturing plane 58 of the interferometer camera 56. The evaluation of one or more interferograms is implemented as likewise already explained with reference to FIG. 1.

Figure 4:
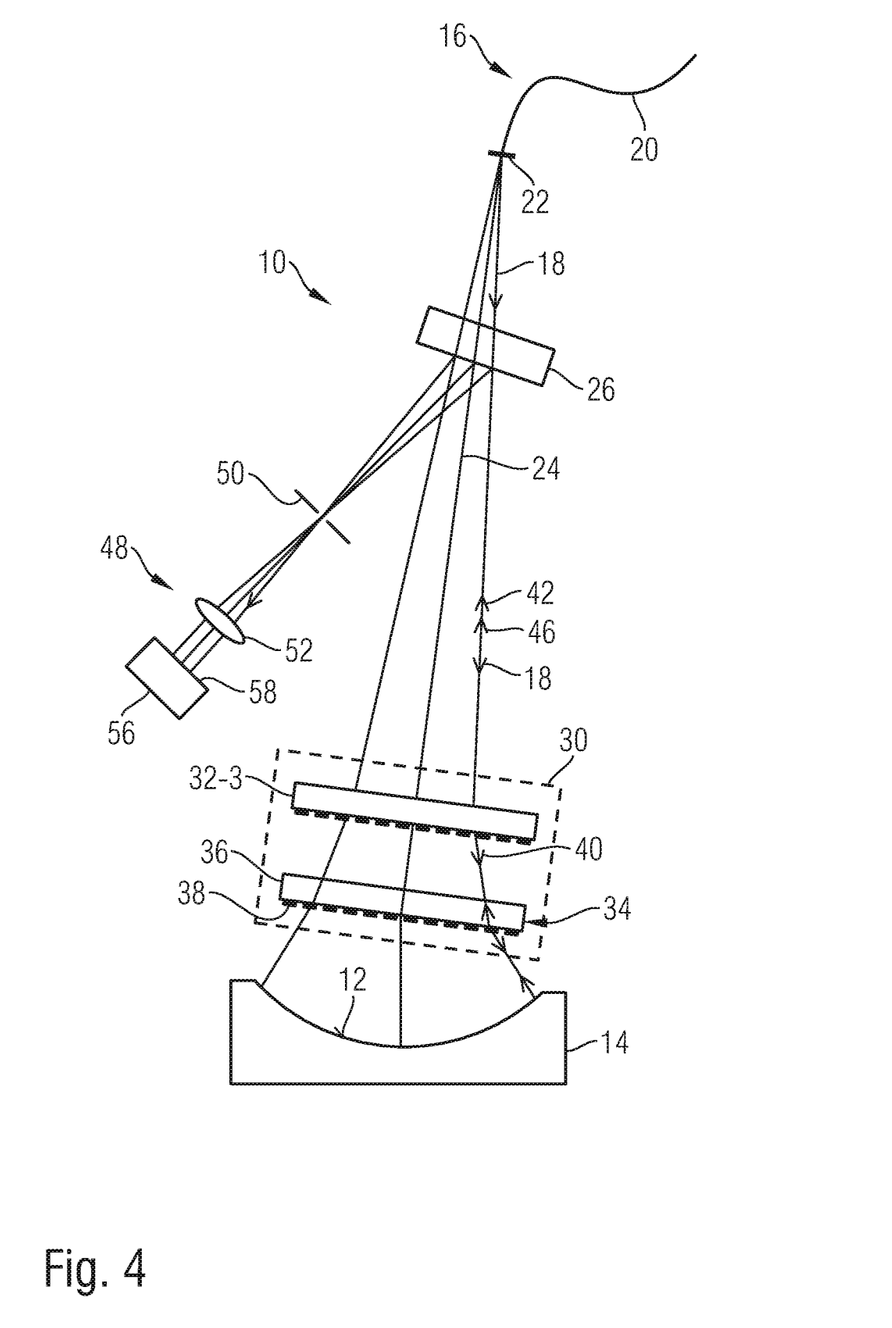
FIG. 4 shows a further embodiment according to the invention of a measurement system for determining the shape of an optical surface of a test object by interferometry.

FIG. 4 depicts a further exemplary embodiment of a measurement system 10 for determining the shape of an optical surface 12 of a test object 14 by interferometry. The measurement system 10 according to FIG. 4 differs from the measurement system according to FIG. 1 only in that a diffractive optical element 32-3 in the form of a CGH is used instead of the diverging lens element 32-1 as the first optical element 32 of the compensation optical unit 30. The diffractive optical element 32-3 is configured to adopt the function of the diverging lens element 32-1 according to FIG. 1; in the depicted embodiment, the diverging approximated input wave 40 is generated during the passage through the diffractive optical element 32-3.

According to an embodiment variant, the diffractive optical element 32-3 is embodied as a multi-step CGH, i.e., as a CGH with a multi-step phase grating, in particular a blazed grating. A so-called blazed grating is a multi-step phase grating with so many steps that its profile is represented by inclined surfaces. A person skilled in the art is aware of background information on multi-step phase gratings, for example from the textbook by Donald C. O'Shea et. al. "Diffractive optics: design, fabrication, and test", 2004, The Society of Photo-Optical Instrumentation Engineers, pages 29 to 35. A multi-step phase grating within the meaning of the application is also understood to mean, in particular, a laterally blazed grating, for example as described in: H. Kleemann et. al., "Combination of blazed and laterally blazed structures", Diffractive Optics and Micro-Optics, OSA Technical Digest (Optical Society of America), paper DTuC7, 2004.

According to a further embodiment variant, the diffractive optical element 32-3 is embodied as an exposure hologram, i.e., as a diffractive optical element produced through holographic exposure.

Figure 5:
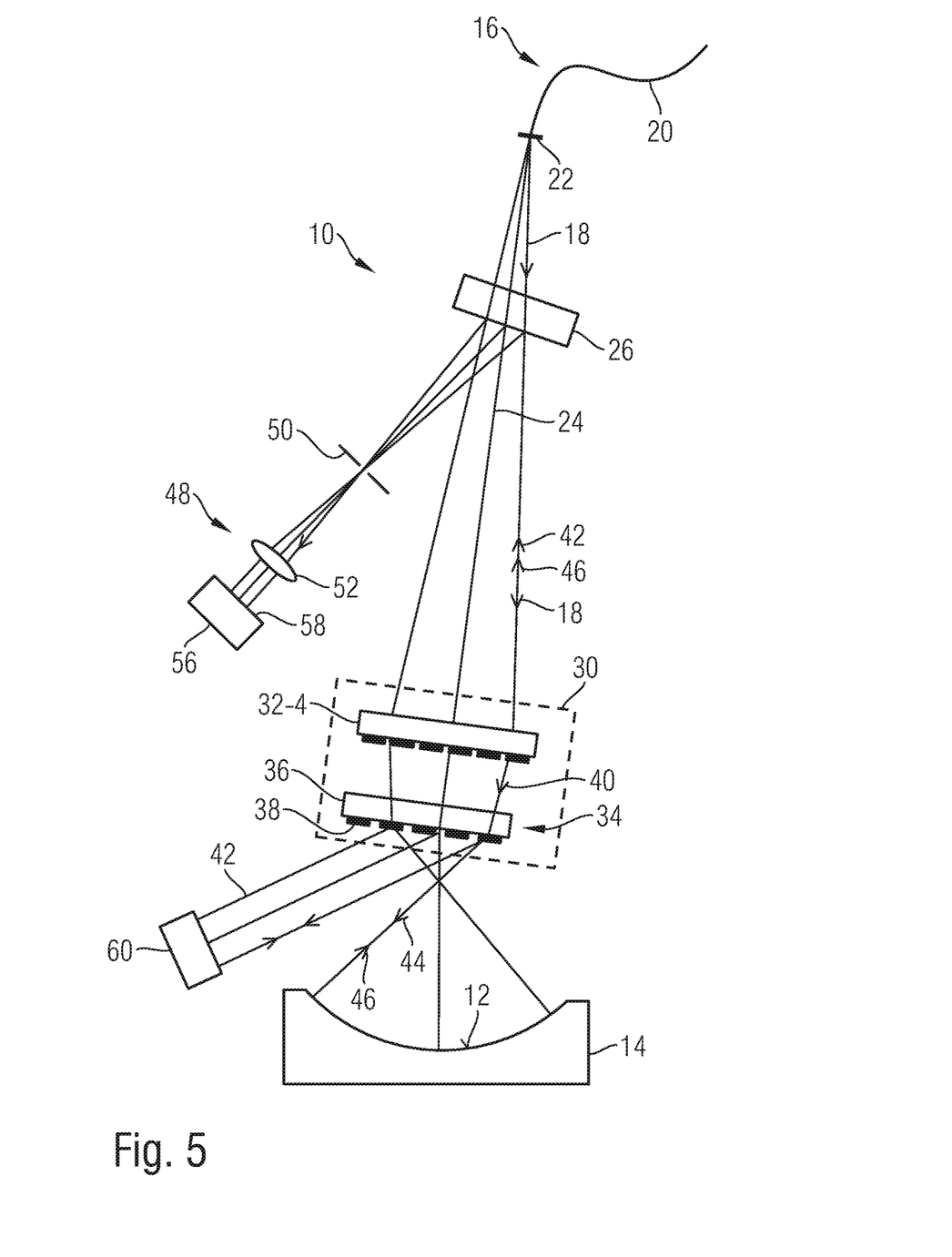
FIG. 5 shows a further embodiment according to the invention of a measurement system for determining the shape of an optical surface of a test object by interferometry.

FIG. 5 depicts a further exemplary embodiment of a measurement system 10 for determining the shape of an optical surface 12 of a test object 14 by interferometry. The measurement system 10 according to FIG. 5 differs from the measurement system according to FIG. 3 only in that a diffractive optical element 32-4 in the form of a CGH is used instead of the converging lens element 32-2 as the first optical element 32 of the compensation optical unit 30. The diffractive optical element 32-4 is configured to adopt the function of the converging lens element 32-2 according to FIG. 3; in the depicted embodiment, the converging approximated input wave 40 is generated during the passage through the diffractive optical element 32-4. The diffractive optical element 32-4 can be embodied analogously to the diffractive optical element 32-3 according to FIG. 4 as a multi-step CGH or as an exposure hologram.

Figure 6:
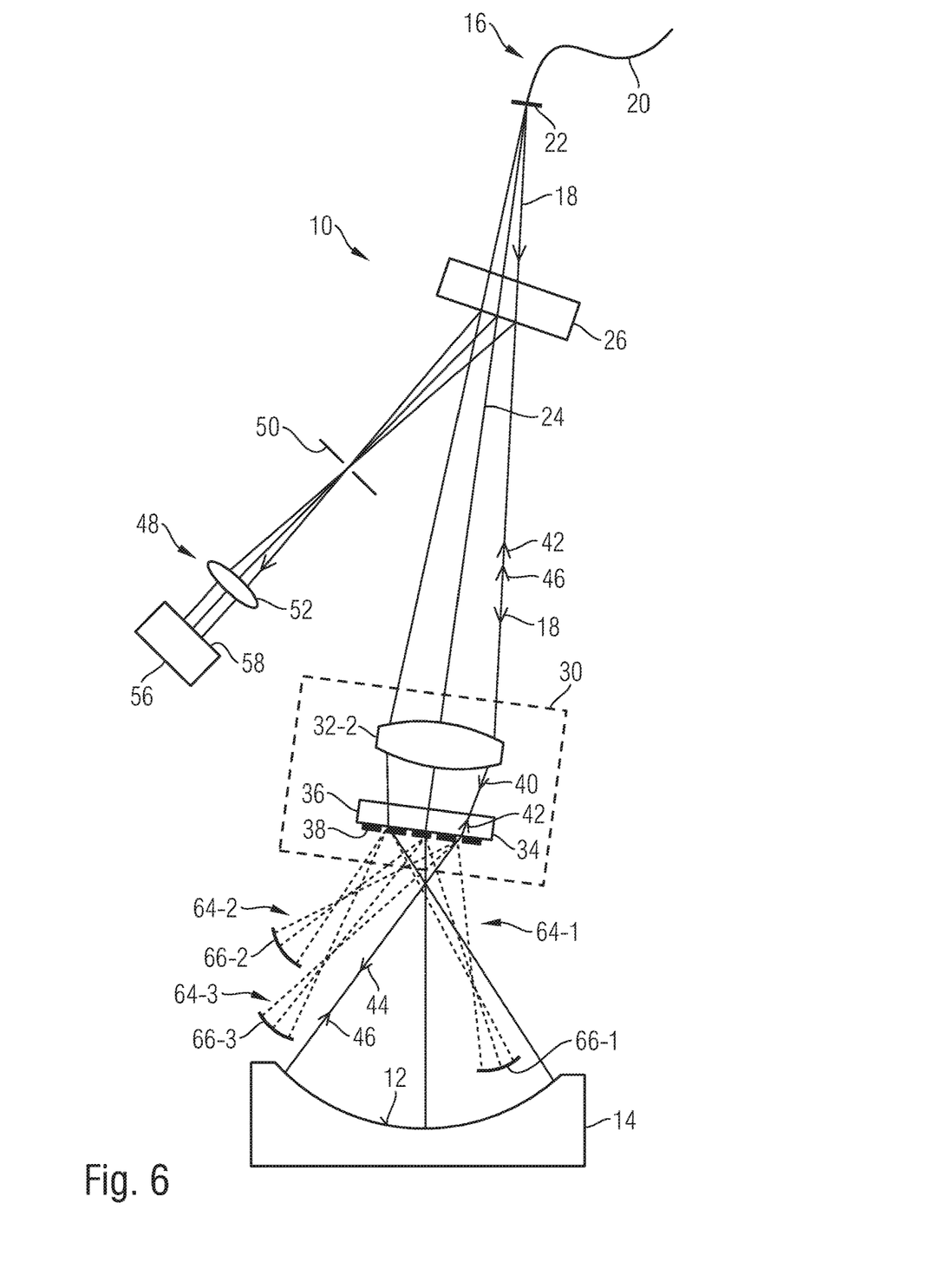
FIG. 6 shows a further embodiment according to the invention of a measurement system for determining the shape of an optical surface of a test object by interferometry.

FIG. 6 depicted a further exemplary embodiment of a measurement system 10 for determining the shape of an optical surface 12 of a test object 14 by interferometry. The measurement system 10 according to FIG. 6 differs from the measurement system according to FIG. 1 only in the structure of the compensation optical unit 30 and in the additional presence of calibration mirrors 66-1 to 66-3. In contrast to the diverging lens element 31-1, the compensation optical unit 30 according to FIG. 6 comprises, as first optical element 32, a converging lens element 32-2 of the type depicted in FIG. 3 for generating the approximated input wave 40 in the form of a convergent beam.

For the second optical element 34, provision is made of a diffractive optical element in the form of a five-fold complex coded CGH, the first phase function of which corresponds to the first phase function of the second optical element 34 in the embodiment according to FIG. 3 for generating the measuring wave 44 with a wavefront at least partly adapted to the shape of the optical surface 12. The second phase function of the second optical element 34 according to FIG. 6 corresponds to the second phase function of the second optical element 34 according to FIG. 1 and is used to generate the reference wave 42 in Littrow reflection.

Moreover, the second optical element 34 according to FIG. 6 comprises three further phase functions, each for generating a calibration wave 64-1, 64-2 and 64-3. In principle, the calibration waves 62 can have plane or spherical wavefronts. They each have spherical wavefronts in the embodiment variant depicted here. The calibration waves 64-1, 64-2 and 64-3 and the measuring wave 44 each have a direction of propagation that differs from that of the other respective waves.

In addition to a measurement mode for measuring the optical surface 12 with the measuring wave 44, the measurement system 10 according to FIG. 6 can also be operated in a calibration mode. To this end, according to one embodiment variant, spherical calibration mirrors 66-1, 66-2 and 66-3, which are accordingly adapted to the spherical calibration waves 66-1 to 66-3, are successively disposed in the respective beam path of the calibration waves 66-1 to 66-3 and measured by interferometry in each case. The calibration mirrors 66-1, 66-2 and 66-3 are each embodied in such a way that the calibration wave 64-1, 64-2 or 64-3 that is incident thereon in each case is reflected back on itself. The interferometric measurement results are stored in an evaluation device as calibration measurement data for each of the calibration waves 66-1 to 66-3.

When the optical surface 12 of the test object 14 is measured with the measuring wave 44 in the measurement mode, which is carried out analogously to the measurement method described above with reference to FIG. 1, the measurement data obtained in this way are evaluated with the stored calibration measurement data being taken into account. On account of the calibration measurement data obtained during the measurement of the calibration wave 62-1 to 62-3 being taken into account, manufacturing errors of the diffractive optical element 34 can be determined with high accuracy in the measurement result of the optical surface 12.

Consequently, it is possible to dispense with explicit measurement of distortion errors of the structure pattern formed by the diffractive structures 38. The option of calibrating the shape measurement of the optical surface 12 with three spherical calibration waves renders it possible to achieve greater accuracy. This is due, in particular, to the fact that shape and profile deviations of the structure pattern generate very similar deviations in the calibration waves 64-1 to 64-3 and the measuring wave 44. Hence, these shape or profile deviations are able to be calibrated for the most part. The diffractive optical elements 34 in FIGS. 1 and 3 to 5 can be configured analogously to the embodiment according to FIG. 6 for the purposes of generating calibration waves.

The above description of exemplary embodiments is to be understood to be by way of example. The disclosure effected thereby firstly enables the person skilled in the art to understand the present invention and the advantages associated therewith, and secondly encompasses alterations and modifications of the described structures and methods that are also evident in the understanding of the person skilled in the art. Therefore, all such alterations and modifications, insofar as they fall within the scope of the invention in accordance with the definition in the accompanying claims, and equivalents thereof, are intended to fall within the scope of protection of the claims.

LIST OF REFERENCE SIGNS

10 Measurement system
12 Optical surface
14 Test object
16 Light source
18 Input wave
20 Optical waveguide
22 Exit surface
24 Propagation axis
26 Beam splitter
30 Compensation optical unit
32 First optical element
32-1 Diverging lens element
32-2 Converging lens element
32-3 Diffractive optical element
32-4 Diffractive optical element
34 Second optical element
36 Substrate
37a Upper side
37b Lower side
38 Diffractive structures
40 Approximated input wave
42 Reference wave
44 Measuring wave
46 Returning measuring wave
48 Capturing device
50 Stop
52 Eyepiece
56 Interferometer camera
58 Capturing plane
60 Reflective optical element
62 Focal point
64-1 to 64-3 Calibration waves
66-1 to 66-3 Calibration mirrors

What is claimed is:

1. A measurement system for determining a shape of an optical surface of a test object by interferometry, comprising a compensation optical unit and a capturing device for capturing an interferogram, which is generated from superimposing a measuring wave following an interaction of the measuring wave with the test object and a reference wave,
    said compensation optical unit being configured to generate the measuring wave, directed at the test object, with a wavefront that is at least partly adapted to a target shape of the optical surface from an input wave and said compensation optical unit comprising:
    a first optical element; and
    a second optical element disposed downstream of the first optical element in a beam path of the input wave,
    wherein a refractive power of the first optical element and a refractive power of the second optical element have mutually same signs,
    wherein an entirety of the compensation optical unit has a refractive power,
    wherein the second optical element is a diffractive optical element, which comprises a complex coded phase grating with at least two different phase functions and which is configured to split the input wave into the measuring wave and the reference wave following an interaction of the input wave with the first optical element, and
    wherein at least 20% of the refractive power of the entire compensation optical unit, which is provided for generating the at least partly adapted wavefront of the measuring wave from a wavefront of the input wave, is allotted to the first optical element and the refractive power allotted to the first optical element has the same sign as the refractive power of the entire compensation optical unit.

2. The measurement system as claimed in claim 1, wherein the second optical element comprises a substrate and diffractive structures, which are configured both for splitting the input wave into the measuring wave and the reference wave and for more closely adapting the wavefront of the input wave, which is approximately adapted to the target shape of the optical surface following an interaction of the input wave with the first optical element, to the target shape.

3. The measurement system as claimed in claim 2, wherein the substrate of the second optical element comprises two opposing surfaces and the diffractive structures are further configured to split the input wave into the measuring wave and the reference wave, wherein the diffractive structures are disposed on only one of the two surfaces of the substrate.

4. The measurement system as claimed in claim 1, wherein the second optical element is configured to generate the reference wave in reflection from the input wave following the interaction of the input wave with the first optical element.

5. The measurement system as claimed in claim 1, wherein the second optical element is configured to generate at least two calibration waves in addition to the measuring wave and the reference wave from the input wave following the interaction of the input wave with the first optical element.

6. The measurement system as claimed in claim 1, wherein the first optical element is a geometrical optics optical element.

7. The measurement system as claimed in claim 6, wherein the first optical element comprises at least one aspherical optical surface.

8. The measurement system as claimed in claim 1, wherein the first optical element is a diffractive optical element.

9. The measurement system as claimed in claim 1, further comprising a light source for providing the input wave.

10. The measurement system as claimed in claim 9, wherein the input wave deviates from a spherical wave by at most 10 µm following an interaction of the input wave with the first optical element.

11. A measurement system for determining a shape of an optical surface of a test object by interferometry, comprising a compensation optical unit, a capturing device for capturing an interferogram, which is generated from superimposing a measuring wave following an interaction of the measuring wave with the test object and a reference wave, and a light source for providing an input wave,
said compensation optical unit being configured to generate the measuring wave, directed at the test object, with a wavefront that is at least partly adapted to a target shape of the optical surface from the input wave and said compensation optical unit comprising:
a first optical element, and
a second optical element disposed downstream of the first optical element in a beam path of the input wave,
wherein a refractive power of the first optical element and a refractive power of the second optical element have mutually same signs,
wherein an entirety of the compensation optical unit has a refractive power,
wherein the second optical element is a diffractive optical element, which comprises a complex coded phase grating with at least two different phase functions and which is configured to split the input wave into the measuring wave and the reference wave following an interaction of the input wave with the first optical element, and
wherein at least 20% of the refractive power of the entire compensation optical unit, which is provided for generating the at least partly adapted wavefront of the measuring wave from a wavefront of the input wave, is allotted to the first optical element and the refractive power allotted to the first optical element has the same sign as the refractive power of the entire compensation optical unit;
wherein the second optical element is configured to generate the reference wave in transmission from the input wave following the interaction of the input wave with the first optical element; and wherein the reference wave has a direction of propagation that deviates from a direction of propagation of the measuring wave, and wherein the measurement system further comprises a reflective optical element, which is disposed in a beam path of the reference wave and which is embodied to reflect back the reference wave.

12. The measurement system as claimed in claim 11, wherein the second optical element comprises a substrate and diffractive structures, which are configured both for splitting the input wave into the measuring wave and the reference wave and for more closely adapting the wavefront of the input wave, which is approximately adapted to the target shape of the optical surface following an interaction of the input wave with the first optical element, to the target shape.

13. The measurement system as claimed in claim 12, wherein the substrate of the second optical element comprises two opposing surfaces and the diffractive structures are further configured to split the input wave into the measuring wave and the reference wave, wherein the diffractive structures are disposed on only one of the two surfaces of the substrate.

14. The measurement system as claimed in claim 11, wherein the second optical element is configured to generate the reference wave in reflection from the input wave following the interaction of the input wave with the first optical element.

15. The measurement system as claimed in claim 11, wherein the second optical element is configured to generate at least two calibration waves in addition to the measuring wave and the reference wave from the input wave following the interaction of the input wave with the first optical element.

16. The measurement system as claimed in claim 11, wherein the first optical element is a geometrical optics optical element.

17. The measurement system as claimed in claim 16, wherein the first optical element comprises at least one aspherical optical surface.

18. The measurement system as claimed in claim 11, wherein the first optical element is a diffractive optical element.

19. The measurement system as claimed in claim 11, wherein the input wave deviates from a spherical wave by at most 10 µm following an interaction of the input wave with the first optical element.

20. A method for determining a shape of an optical surface of a test object by interferometry, comprising:
providing an input wave,
generating a reference wave and a measuring wave directed at the test object with a wavefront that is at least partly adapted to a target shape of the optical surface by radiating the input wave onto a compensation optical unit, which comprises:
a first optical element disposed in a beam path of the input wave, and
a second optical element, disposed downstream of the first optical element in the beam path of the input wave, wherein the second optical element is a diffractive optical element, which comprises a complex coded phase grating with at least two different phase functions such that, following an interaction of the input wave with the first optical element, the input wave is split into the measuring wave and the reference wave by the diffractive optical element,
wherein a refractive power of the first optical element and a refractive power of the second optical element have mutually same signs,
wherein an entirety of the compensation optical unit has a refractive power, and
wherein at least 20% of the refractive power of the entire compensation optical unit applied in said generating of the measuring wave is allotted to the first optical element and the refractive power allotted to the first optical element has the same sign as the refractive power of the entire compensation optical unit, and capturing an interferogram, which is generated by superimposing the measuring wave following an interaction of the measuring wave with the test object and the reference wave.

\* \* \* \* \*

UNITED STATES PATENT AND TRADEMARK OFFICE
CERTIFICATE OF CORRECTION

| | |
|---|---|
| PATENT NO. | : 11,199,396 B2 |
| APPLICATION NO. | : 16/833571 |
| DATED | : December 14, 2021 |
| INVENTOR(S) | : Hetzler et al. |

It is certified that error appears in the above-identified patent and that said Letters Patent is hereby corrected as shown below:

On the Title Page

Page 2, Column 2, under item (56) "OTHER PUBLICATIONS" delete "Reporton" and insert -- Report on --.

In the Specification

Column 1, Line 53, delete "Object," and insert -- object, --.

Column 9, Line 26, delete "32," and insert -- 32 --.

Signed and Sealed this
Fourth Day of April, 2023

Katherine Kelly Vidal
*Director of the United States Patent and Trademark Office*